United States Patent [19]

Yakuwa et al.

[11] Patent Number: 4,982,295

[45] Date of Patent: Jan. 1, 1991

[54] METHOD FOR CENTERING A READ/WRITE HEAD OF A MAGNETIC DATA STORAGE APPARATUS ON A TRACK OF A MAGNETIC DISK

[75] Inventors: Mitsuhiro Yakuwa; Mitsugu Hirata, both of Tendo; Tomohiko Tonishi, Kawasaki, all of Japan

[73] Assignee: Mitsumi Electric Co., Ltd., Japan

[21] Appl. No.: 302,399

[22] Filed: Jan. 26, 1989

[30] Foreign Application Priority Data

Jan. 28, 1988 [JP] Japan .................................. 63-18394

[51] Int. Cl.$^5$ ............................................. G11B 5/596
[52] U.S. Cl. ................................... 360/77.04; 360/49; 360/135
[58] Field of Search ............... 360/40, 49, 72.2, 77.04, 360/77.07, 77.08, 135

[56] References Cited

U.S. PATENT DOCUMENTS

| | | | |
|---|---|---|---|
| 4,122,503 | 10/1978 | Allan .................................. | 360/78.05 |
| 4,149,199 | 4/1979 | Chick et al. ...................... | 360/77.04 |
| 4,584,690 | 4/1986 | Cafiero et al. ..................... | 360/72.2 |
| 4,628,372 | 12/1986 | Morisawa ........................... | 360/72.2 |
| 4,695,904 | 9/1987 | Shinyagaito et al. .............. | 360/72.2 |
| 4,807,057 | 2/1989 | Kashida et al. .................... | 360/49 |
| 4,811,321 | 3/1989 | Enari et al. ........................ | 360/49 |
| 4,819,095 | 4/1989 | Asano et al. ...................... | 360/77.04 |
| 4,827,362 | 5/1989 | Baba .................................. | 360/77.04 |

FOREIGN PATENT DOCUMENTS 61-206977  9/1986  Japan .

OTHER PUBLICATIONS

IBM Technical Disclosure Bulletin, vol. 19, No. 6, Nov. 1976, Self-Calibrating Disk Storage Apparatus, Griffiths et al., pp. 1991–1992.

Sarisky, Larry, "Refined Closed-Loop Servo Enhances Low-Cost Disk Drive's Accuracy", Electronics, Mar. 10, 1983, pp. 139–142.

Nikkei Electronics, Jul. 18, 1983, pp. 222–223.

Primary Examiner—Alan Faber
Assistant Examiner—David L. Robertson
Attorney, Agent, or Firm—Andrus, Sceales, Starke & Sawall

[57] ABSTRACT

A method of centering a read/write head of a magnetic data storage apparatus on a desired track comprises steps of defining an inside reference track and an outside reference track on the magnetic disk, each of which being recorded with (a) a first servo control data at a center thereof, (b) a second servo control data retarded in time corresponding to a predetermined rotational angle of the disk with respect to the first data at a position offset towards either one of the inner side of the disk and the outer side of the disk by a half width of the track, the predetermined rotational angles being different in the inside reference track and the outside reference track, and (c) a third servo control data retarded from the second data at a position offset towards the other one of the inner side of the disk and the outer side of the disk by a half width of the track. The center of the track is detected by comparing levels of reproduced second and third servo control data, and the position of the head is corrected accordingly. Such a correction is repeated periodically.

5 Claims, 4 Drawing Sheets

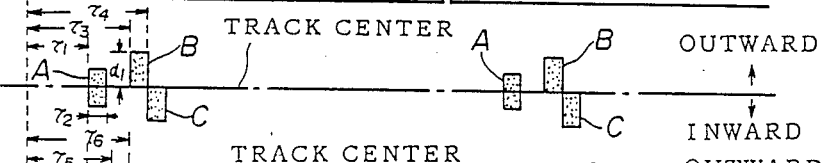
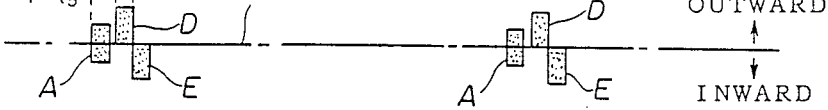
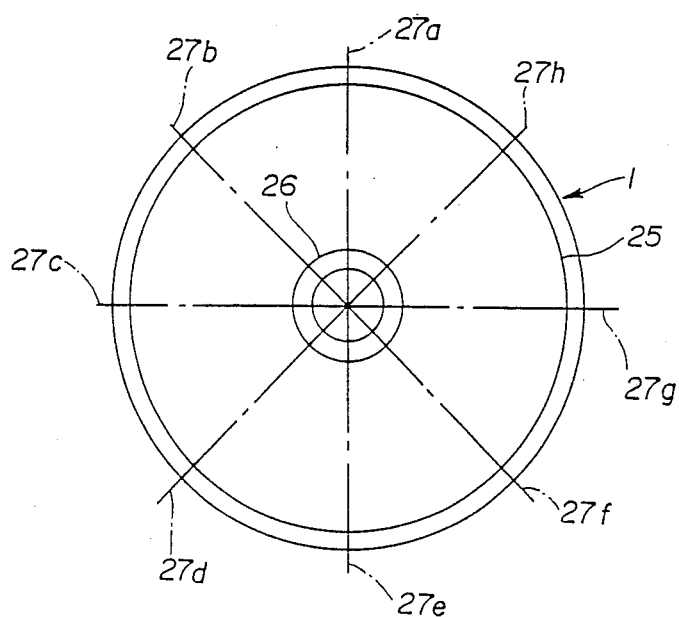

METHOD FOR CENTERING A READ/WRITE HEAD OF A MAGNETIC DATA STORAGE APPARATUS ON A TRACK OF A MAGNETIC DISK

BACKGROUND OF THE INVENTION

The present invention relates in general to methods of centering a read/write head of a data storage apparatus which stores an information data on a magnetic disk, and in particular to a method of centering such a read/write head on a track of a magnetic disk along which an information data is recorded.

In a data storage apparatus which stores an information data on a magnetic disk along a recording track by means of a read/write head, various methods are proposed for centering the head accurately on the center of the track so that the density of the tracks and thus the recording density on the disk can be increased.

For example, a so-called "Inside Diameter-Outside Diameter Method" or "OD-ID" method is described in NIKKEI ELECTRONICS, July 18, 1983, pp.222-223. According to this method, the innermost and outermost tracks are used as reference tracks, and a minimum stepwise movement of the read/write head performed by a step motor across the magnetic disk is corrected so that the head is positioned exactly on the center of the track of the disk. According to this method, the amount of minute correction to the stepwise movement is obtained for a desired track and the position of the the head is adjusted by applying the correction thus obtained to the minimum stepwise movement of the step motor when the desired track is scanned.

In the aforementioned conventional method, there is a need to keep on watching whether the read/write head is scanning exactly along the center of the track or not in order to secure proper centering of the head. Further, it is necessary to distinguish the two reference tracks. Furthermore, there is a problem in that the magnetic disk may be expanded or contracted particularly in a radial direction when the ambient temperature is changed. Such a deformation of the magnetic disk results in a change in the distance between adjacent tracks which tends to offset the position of the head from the exact center of the track. Such an offset can become a serious problem when the density of the track on the disk is increased. Therefore, in order to secure a reliable operation of the data storage apparatus, there is a need to apply correction to the position of the head so that the position of the read/write head is corrected with respect to such a deformation of the disk. So far, no satisfactory solution to such a problem is known.

SUMMARY OF THE INVENTION

Accordingly, it is a general object of the present invention to provide a novel and useful method of positioning a read/write head cf a magnetic data storage apparatus exactly on the center of a track defined on a magnetic disk on which an information data is recorded, wherein the aforementioned problems are eliminated.

Another and more specific object of the present invention is to provide a method of positioning a read/write head of a magnetic data storage apparatus exactly on the center of a track of a magnetic disk on which an information data is recorded, wherein the center of a pair of reference tracks is detected accurately, the two reference tracks can be distinguished from one another, and the deviation in the position of the read/write head with respect to the center of an arbitrary track on the magnetic disk due to temperature change of the disk is compensated.

Another object of the present invention is to provide a method of positioning a read/write head of a magnetic data storage apparatus which records and/or reproduces an information data on and from a magnetic disk exactly on the center of the track defined on the disk, comprising steps of defining an inside reference track and an outside reference track on the magnetic disk, each of which being recorded with a first servo control data at a center thereof, a second servo control data retarded by a predetermined time corresponding to a rotational angle of the disk with respect to said first data at a position offset towards the inner side of the disk (or towards the outer side of the disk) by a half width of the track, said predetermined time retardation being different in the inside reference track and the outside reference track, and a third servo control data further retarded from said second data at a position offset towards the outer side of the disk (or towards the inner side of the disk) by a half width of the track; scanning the inside reference track and the outside reference track periodically each time a predetermined time interval has elapsed by moving the read/write head; reproducing the second and third servo control data by the read/write head; re-positioning the read/write head by moving the head such that the level of reproduced signals corresponding to the second servo control data and the third servo control data coincides each other within a predetermined value; obtaining and storing an amount of offset in the position of the read/write head when the read/write head is re-positioned in the re-positioning step, said amount of offset being the amount of movement of the read/write head achieved in the re-positioning step; calculating another amount of offset for a desired track on the basis of the aforementioned offset for the inside reference track and the outside reference track; and correcting the position of the read/write head for the desired track by said amount of offset obtained in the calculating step.

According to the present invention, the center of the track is accurately detected on the basis of the detection of disappearance of the the difference in the level of the reproduced second and third servo control data, as the second and the third servo control data are recorded on each of the inside reference track and the outside reference track with such a relation that the second data is offset in one direction by the half track width from the center of the track and the third data is offset in an opposite direction by the half track width from the center of the track. Further, the inside reference track and the outside reference track are easily distinguished from one another, as the distance between the first and second servo control data is made different in the inside reference track and the outside reference track. Furthermore, the deviation in the position of the read/write head due to the ambient temperature change can be eliminated as the reference to the inside and outside reference tracks is made periodically.

Other objects and further features of the present invention will become apparent from the following description for a preferred embodiment when read in conjunction with attached drawings

BRIEF DESCRIPTION OF THE DRAWINGS

FIGS. 2A-2D and 3 are diagrams for explanation of the reference track of the present invention.

DETAILED DESCRIPTION

Figure 1:
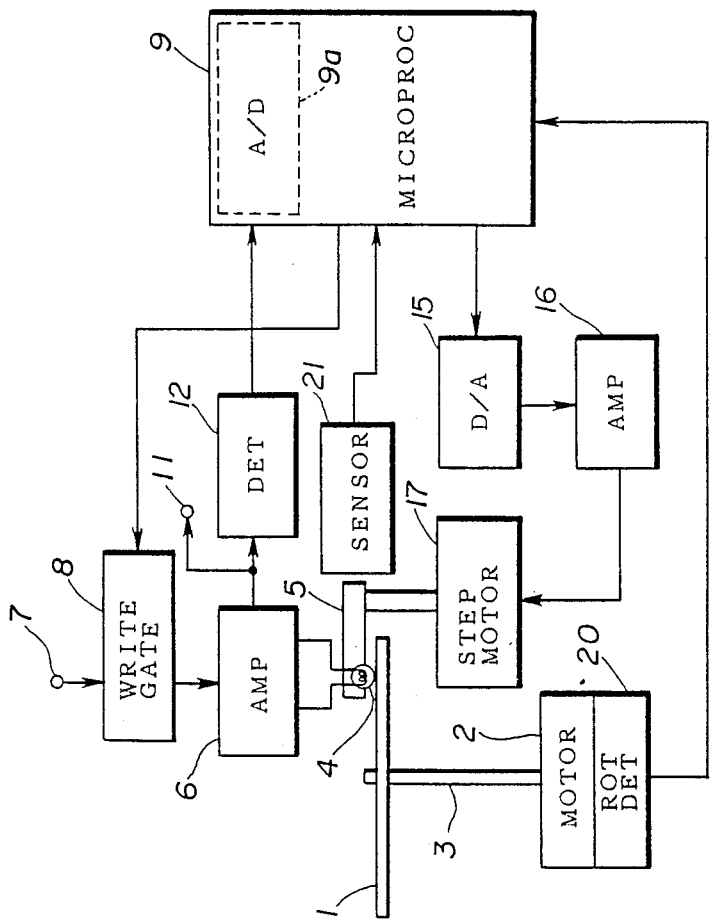
FIG. 1 is a block diagram showing an embodiment of a magnetic disk data storage apparatus to which the method of the present invention is applicable.

FIG. 1 is a block diagram showing an embodiment of a magnetic disk data storage apparatus to which the present invention is applicable.

Referring to the drawing, a magnetic disk 1 is mounted on a rotary shaft 3 of a motor 2 which is rotated at a constant speed. In a vicinity of the the disk 1, a magnetic head 4 is held on an arm 5 such that the head 4 faces a surface of the magnetic disk 1.

The magnetic head 4 is connected to an amplifier 6. In a writing or recording mode, an information signal is applied to an input terminal 7 and the information signal is supplied to the amplifier 6 after passing through a write control gate 8. The amplifier 6 amplifies the supplied information signal and records the signal on the magnetic disk 1. The write control gate 8 is controlled by a microprocessor 9 and controls the writing of the information signal on the disk 1. When in a read mode or reproducing mode, the magnetic head 4 reproduces the information signal recorded on the disk 1, and the reproduced signal is supplied to the amplifier 6. After the amplification, the signal is supplied to an output terminal 11 for external data processing system (not shown) as well as to a servo data detector 12. The servo data detector 12 performs an envelope detection of a signal having a frequency of a servo control data (2.5 MHz, for example), and supplies an output signal to the microprocessor 9.

The microprocessor 9 has an analogue-to-digital converter 9a therein which converts the output signal from the servo data detector 12 to a digital data. The microprocessor 9 further outputs a head transport control data which controls the movement of the head 4. The head transport control data is converted to an analogue head control signal in a digital-to-analogue converter 15 and is supplied to a step motor 17 after amplification in an amplifier 16. The step motor 17 is driven by the head control signal from the amplifier 16 and responsive thereto, the head arm 5 carrying the magnetic head 4 is moved stepwise towards radially inner direction or radially outer direction of the disk 1.

Further, the motor 2 revolving the disk 1 cooperates with a rotation detector 20 which produces a rotation detection signal for each revolution of the motor 2, and this rotation detection signal is supplied to a microprocessor 9. There is also provided a sensor 21 which detects the arm 5 carrying the magnetic head 4 and produces a detection pulse to be supplied to the microprocessor 9 when the head 4 is at the outermost track position of the disk 1.

When the disk 1 is mounted on the rotary shaft 3, the microprocessor 9 produces the head transport control data and moves the magnetic head 4 towards the outer side of the disk 1 until the sensor 21 produces the detection pulse indicating that the head 4 is located at the outermost track position of the disk 1. Thereafter, responsive to the rotation detection signal as illustrated in FIG. 2(A) from the rotation detector 20, a reference pulse as shown in FIG. 2(B) having a frequency which is a multiple of the frequency of the rotation detection signal by a number n (n is an integer equal to or larger than two) is produced. Also, it is possible to use the rotation detection signal itself as the reference pulse without frequency multiplication.

Next, a gate control pulse having a pulse width of $\tau 2$ which is retarded from the reference pulse by a predetermined time $\tau 1$ is produced, and this gate control pulse is supplied to the write control gate 8. Responsive to this, the write control gate 8 passes a servo control signal having the frequency of 2.5 MHz at the input terminal 7 to the amplifier 6. As a result of this operation, n first servo control data A as illustrated in FIG. 2(C) are recorded along the center of the outermost track of the magnetic disk 1.

Next, the microprocessor 9 moves the head 4 in a radially outer direction of the disk 1 by a half width d/2 where d stands for the width of the track, and supplies another gate control pulse having the pulse width of $\tau 2$ and retarded by another predetermined time $\tau 3$ with respect to the reference pulse. As a result, n second servo control data B are recorded along the outermost track at the position offset towards the radially outer direction by the amount of d/2 with such a timing that the data B is delayed by a time $\tau 3 - \tau 1$ with respect to the preceding data A as illustrated in FIG. 2(C). Further, the magnetic head 4 is moved towards the radially inner direction of the disk from the center of the outermost track by the distance d/2, and the write control gate 8 is activated responsive to another gate control pulse having the pulse width of $\tau 2$ and retarded from the reference pulse by another predetermined time $\tau 4$ where $\tau 4 \geq \tau 3 + \tau 2$. As a result, n third servo control data C are recorded along the outermost track at the position offset in the radially inner direction of the disk from the center of the track by the amount of d/2 with such a timing that the data C is delayed by a time $\tau 4 - \tau 1$ with respect to the data A as illustrated in FIG. 2(C).

Next, the magnetic head 4 is moved from the outermost track to the innermost track by driving the step motor 17 for a predetermined number of steps such as several hundred steps to one thousand and several hundred steps. When the movement is completed, the magnetic head is located exactly at the center of the innermost track of the magnetic disk 1. Thereafter, the microprocessor 9 supplies a gate control pulse having the pulse width of $\tau 2$ to the write control gate 8 after the predetermined time $\tau 1$ from the reference pulse, and n servo control data A are recorded along the center of the innermost track as illustrated in FIG. 2(D). Next, the microprocessor 9 moves the magnetic head 4 towards the radially outward direction of the disk 1 by the distance d/2 similarly to the case of the servo control data B, and responsive to the another control pulse having the pulse width of $\tau 2$ and which is retarded from the reference pulse by a predetermined time $\tau 5$ in which $\tau 5 < \tau 3$, the second servo control data D for the innermost track is recorded along the innermost track at the position offset towards the radially outward direction of the disk with such a timing that the data D is delayed from the reference pulse by the time $\tau 5$ as illustrated in FIG. 2(D). Further, the microprocessor 9 moves the magnetic head 4 from the center of the innermost track in the radially inner direction by the distance d/2, and responsive to another gate control pulse having the pulse width $\tau 2$ and which is retarded from the reference pulse by a predetermined time $\tau 6$ in which $\tau 6 = \tau 5 + \tau 2$, n third servo data E are recorded along the innermost track at the position offset towards the radially inner direction of the disk with a timing such that the data E is delayed from the data D by a time $\tau6-\tau5$ as illustrated in FIG. 2(D).

Thus, the magnetic disk 1 shown in FIG. 3 is formed with an outermost reference track 25 at its outermost periphery and an innermost reference track 26 at its innermost periphery. The information is recorded on a portion of the magnetic disk 1 located between the pair of reference tracks 25 and 26. Further, the tracks adjacent to the reference tracks, i.e. the track located immediately inside the reference track 25 and the track located immediately outside the reference track 26 are prohibited from being recorded so that the servo control data A, B, C, D and E recorded on the tracks 25 and 26 are not erased accidentally. When the aforementioned number n is eight, for example, the servo data A-E are recorded on the disk at the positions which are defined as the intersection of the tracks 25 or 26 with one-dotted lines 27a-27h of FIG. 3. These intersections are located with an equi-angular distance from one another.

Next, the operation performed by the microprocessor 9 to determine the position of the magnetic head will be described with reference to the flowcharts of FIGS. 4 and 5.

Referring to FIG. 4, the microprocessor 9 performs the initialization (step 30) responsive to the power ON of the magnetic disc data storage apparatus. As a result of the initialization, the magnetic head 4 is moved to a position in which the sensor 21 produces the detection pulse indicating that the head 4 is located at the outermost track position of the disk. Then, the magnetic head 4 is transported to the inside reference track 26 located at the innermost track position of the disk and the servo control data on the reference track 26 is detected (step 31).

Figure 5:
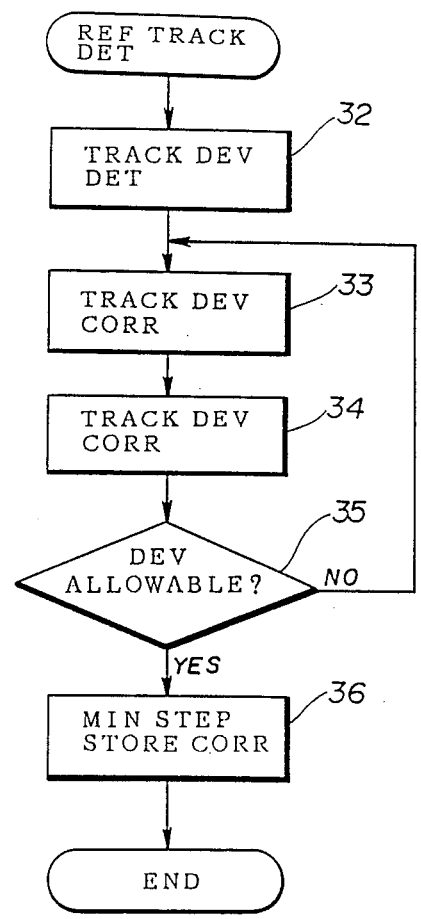

FIG. 5 shows the detection of the servo control data. Referring to FIG. 5, a difference in the reproduced level of the data B and the data C or the data D and the data E is obtained from the servo data detector 12 in a step 32. Such a difference in the level will be referred to as a "track deviation". Next, the magnetic head 4 is moved towards a direction to reduce the track deviation by feeding the head transport control data to the digital-to-analogue converter 15 (step 33), and the track deviation is detected again in a step 34. Thereafter, it is discriminated if the track deviation is within a predetermined range in a step 35, and if YES, the step 33 is performed again. On the other hand, if the track deviation is within the predetermined range, a correction value needed to correct the unit or minimum step of movement of the step motor 17 to center the head on a track is stored in a step 36.

Figure 4A:
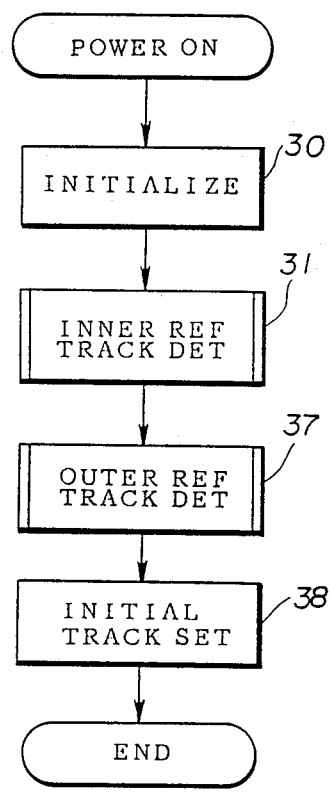
FIGS. 4A, 4B and 5 are flowcharts showing the positioning operation performed by a microprocessor.

In the aforementioned procedure, the correction value for correcting the minimum step for the inside reference track 26 is stored and this procedure corresponds to the step 31 of FIG. 4(A). In the next step 37, the microprocessor 9 drives the step motor 17 for a predetermined number of steps and brings the magnetic head 4 to the outside reference track 25 located at the outermost track position of the disk 1. In this position, the servo control detection of FIG. 5 is repeated and a correction value for correcting the minimum step of movement of the step motor 17 at the reference track 25 is stored.

Thereafter, the magnetic head 4 is transported to another track called an initial track located inside of the outside reference track 25 by two tracks.

Figure 4B:
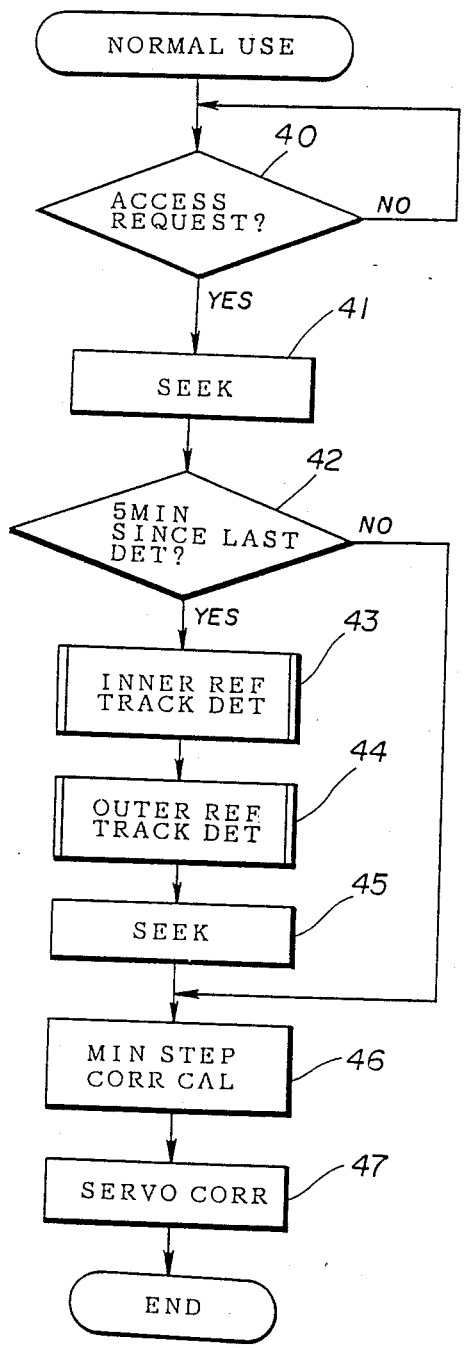

FIG. 4(B) shows the operation of the microprocessor 9 in a normal operating state in which the power is turned ON previously. Referring to the drawing, the microprocessor 9 discriminates in a step 40 the existence or non-existence of a request for access, and when there is a request for access, a seek procedure is performed in which the magnetic head 4 is transported to a desired track (step 41).

Then, it is discriminated if a predetermined time has elapsed since the last servo control data detection in a step 42. This predetermined time may be chosen, for example, to five minutes. When the predetermined time has elapsed, the servo control data detection similar to the steps 31 and 37 is performed for the inside reference track 26 and for the outside reference track 25 in steps 43 and 44. Thereby, the correction value for correcting the minimum step previously stored is updated by those obtained in the steps 43 and 44. Thereafter, a seek operation similar to the seek operation of the step 41 is performed in a step 45.

After the step 45, or when it is discriminated in the step 42 that the predetermined time has not elapsed since the last servo control data detection, a step 46 is performed in which a correction value of the minimum step for the desired track is calculated. In this calculation, it is assumed that the correction value for an arbitrary track changes linearly from the outside reference track to the inside reference track or vice versa. Then, the microprocessor 9 supplies the calculated correction value to the digital-to-analogue converter 15 and adjusts the position of the magnetic head 4. With this adjustment, the magnetic head 4 is located exactly on the center of the desired track.

According to the procedure described heretofore, the centering of the magnetic head 4 in a track is accurately and easily detected as a result of the comparison of the reproduced level of the second and third servo control data such as B and C or D and E which are offset from the center of the track towards the radially inner direction and outer direction of the disk. Further, the second and the third control data are easily distinguished from one another as the timing of the second servo control data measured from the timing of the first servo control data is changed from the timing of the third servo control data measured from the timing of the first servo control data.

According to the procedure in FIG. 4(B), the deviation in the positioning of the magnetic head due to the change in ambient temperature is eliminated as the correction value for the inside reference track and the outside reference track is updated periodically with a predetermined interval such as five minutes.

Further the present invention is not limited to those embodiments but various variations and modifications may be made without departing from the scope of the present invention.

What is claimed is:

1. A method of positioning a read/write head of a magnetic data storage apparatus reading and/or writing an information data on and from a magnetic disk along a track defined thereon such that the read/write head is positioned exactly on the center of a desired track, comprising steps of:

defining an inside reference track and an outside reference track on the magnetic disk, each of which having a predetermined track width and recorded with (a) a first servo control data at a center thereof, (b) a second servo control data retarded in time corresponding to a predetermined rotational angle of the disk with respect to said first data at a position offset towards either one of the inner side of the disk and the outer side of the disk by a half width of the track, said predetermined rotational angles being different in the inside reference track and in the outside reference track, and (c) a third servo control data further retarded from said second data at a position offset towards the other one of the inner side of the disk and the outer side of the disk by a half width of the track;

scanning the inside reference track and the outside reference track periodically each time a predetermined time interval has elapsed by the read/write head;

reproducing the second and third servo control data by the read/write head;

re-positioning the read/write head by moving the head such that the level of reproduced signals corresponding to the second servo control data and the third servo control data substantially coincide each other;

obtaining an amount of offset in position of the read/write head when the read/write head is re-positioned in the re-positioning step, said amount of offset being the amount of movement of the read/write head achieved in the re-positioning step;

calculating another amount of offset for a desired track located between the inside and outside reference tracks on the basis of the aforementioned offset for the inside reference track and the outside reference track; and correcting the position of the read/write head for the desired track by said amount of offset obtained in the calculating step.

2. A method as claimed in claim 1 in which a plurality of servo control data sets each comprising said first, second and third servo control data are recorded on said inside and outside reference tracks with an equiangular separation therebetween.

3. A method as claimed in claim 1 in which said reproducing step comprises envelope detection of the second and third servo control data on the inside reference track and the outside reference track.

4. A method as claimed in claim 1 in which said calculating step comprises a linear interpolation of the offset amount for the desired track on the basis of the offset amount for the inside reference track and the outside reference track.

5. A method as claimed in claim 1 in which said step of re-positioning comprises movement of the read/write head such that the difference in the reproduced level of the second and third servo control data substantially disappears.

* * * * *